July 30, 1957 D. E. LIPFERT 2,801,352
MOTOR OF REGULATED OUTPUT TORQUE
Filed May 28, 1956 2 Sheets-Sheet 1
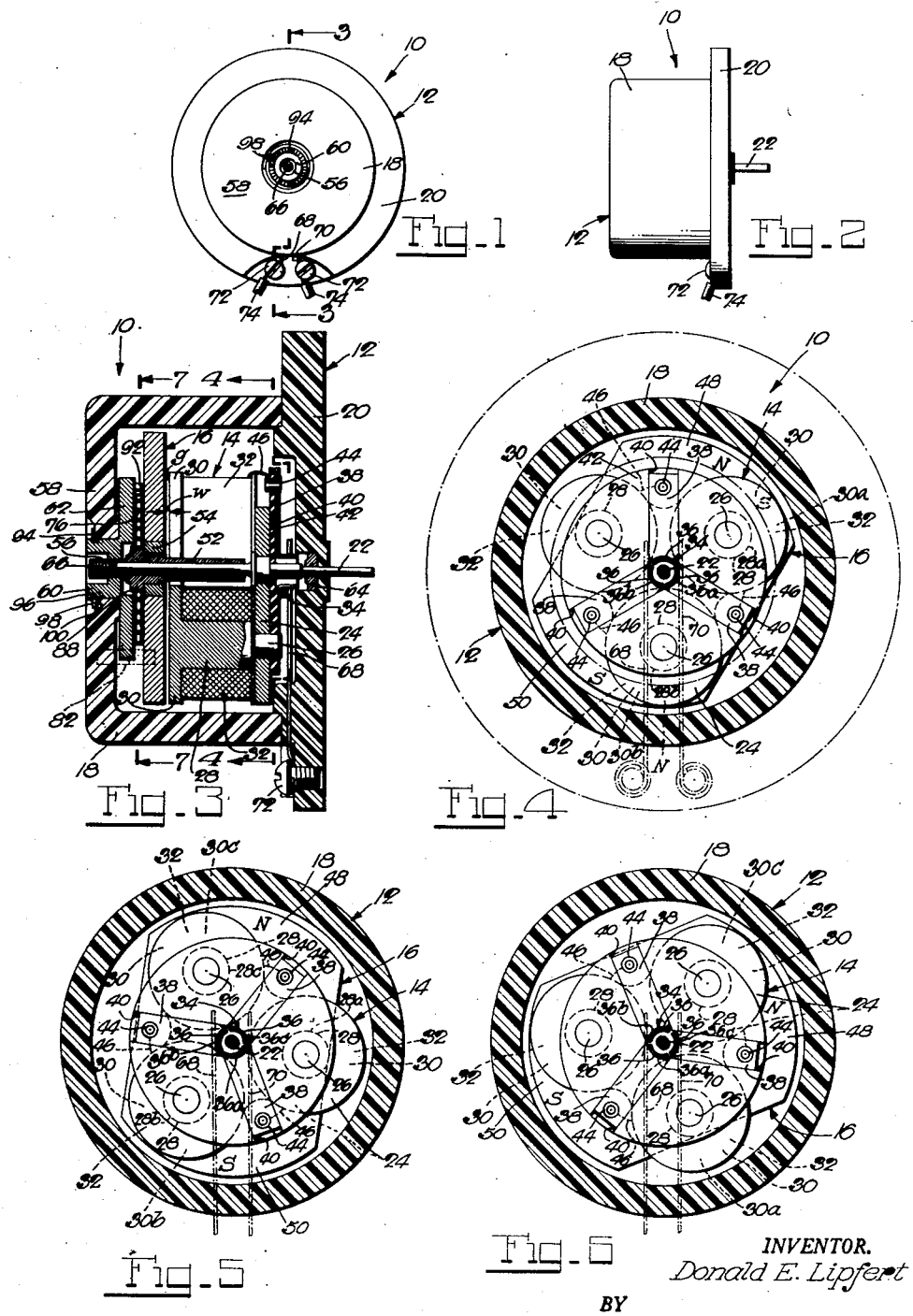
INVENTOR.
Donald E. Lipfert
BY
Attorney.

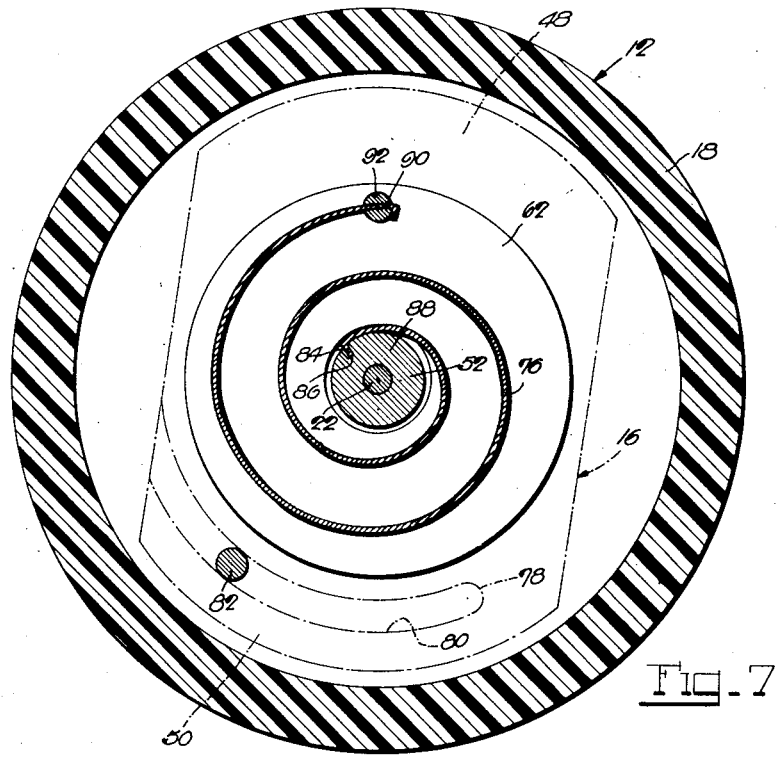
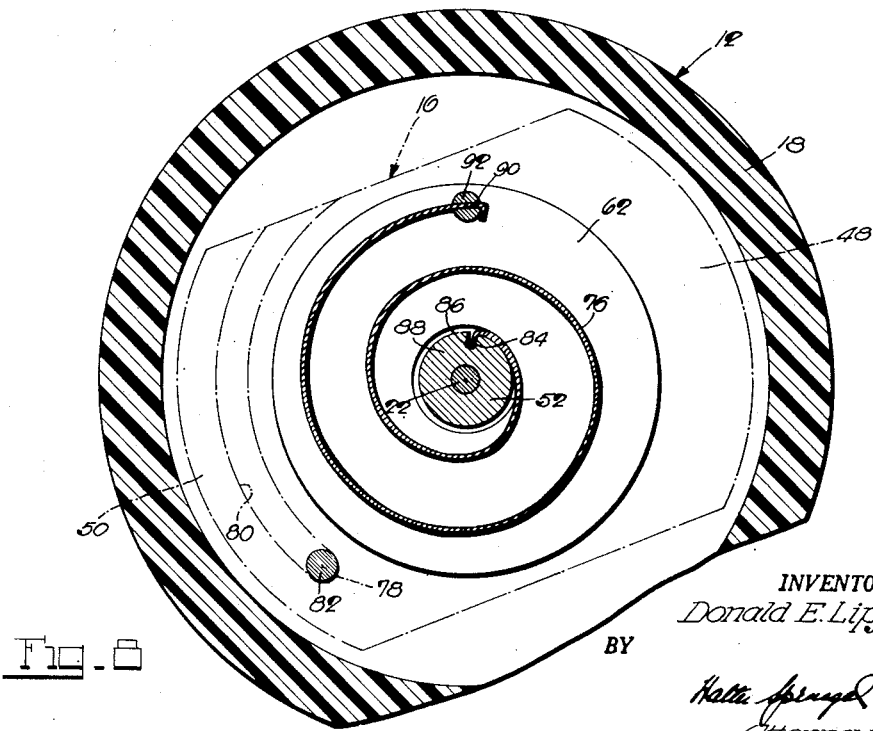

United States Patent Office 2,801,352
Patented July 30, 1957

2,801,352

MOTOR OF REGULATED OUTPUT TORQUE

Donald E. Lipfert, Middletown, Conn., assignor to The E. Ingraham Company, Bristol, Conn., a corporation of Connecticut Application May 28, 1956, Serial No. 587,512

15 Claims. (Cl. 310—49)

This invention relates to motors in general, and to D. C. motors of a regulated output torque type in particular.

A prior motor of this type is disclosed in the patent to Putnocky, No. 2,624,017, dated December 30, 1952. This motor features a rotor unit having an armature and a commutator that are separated from each other, and a preloaded spring which drivingly connects them so that the commutator receives torque from and is driven by the spring which, in turn, is kept loaded by the armature. The motor additionally features an escapement which is operatively associated with the commutator, so that the latter may not only serve as a constant-rate driver for a time mechanism but also impart torque thereto which to all practical intents and purposes is sufficiently constant in magnitude to assure fairly accurate timekeeping performance of the same.

It is an important object of the present invention to provide a motor of this type in which the field is arranged resiliently to oppose with a predetermined force the magnetic torque developed in the motor so as progressively to yield on subjection to an increasingly greater force and, hence, control a predetermined upper range of the output torque of the motor, including its maximum possible torque. In thus arranging the field, the instant motor may not only have the same performance and ensuing advantages as the aforementioned prior motor, but also permits the use of a conventional armature and commutator assembly with its torque output shaft, thereby simplifying the motor construction and facilitating its assembly in any event, as well as permitting the use of enduring non-flexible lead connections between the armature coils and commutator. Furthermore, the instant motor is readily adaptable as a dynamometer due to the easily perceptible featured yield or displacement of its field which may be calibrated to indicate the commensurate torque on an associated scale.

It is another object of the present invention to provide a motor of this type in which the field is turnable coaxially of the turnable armature and commutator assembly, and its aforementioned resilient opposition to the developed magnetic torque in the motor may advantageously be achieved by a preloaded spring, thereby not only further facilitating the assembly of the motor by fixedly anchoring the spring at one end in the motor and drivingly connecting it at its other end with the field, but also preventing run-down of the spring beyond its preloaded condition by the simple expediency of a fixed stop in the motor against which the field will be backed by the spring when the motor is idle.

It is a further object of the present invention to provide a motor of this type in which the aforementioned fixed end of the spring is adjustable, thereby not only permitting variation of the preload of the latter and, hence, variation of the aforementioned controlled upper range of the motor torque, as well as further facilitating the assembly of the motor by permitting preloading of the spring advantageously after the assembly is finished, but also permitting preloading of the springs of mass-produced motors of this type to the same torque magnitude despite variations in their spring characteristics, as well as further enhancing the adaptability of the instant motor as a dynamometer over a relatively wide torque range.

Another object of the present invention is to provide a motor of this type in which the aforementioned fixed end of the spring is adjustable even while the motor is running, thereby permitting torque regulation or adjustment even under dynamic conditions.

A further object of the present invention is to provide a motor of this type in which the air gap between the field and armature poles is arranged axially of the motor and the field structure is designed to have a relatively small mass as well as radius of gyration and, hence, a small moment of inertia, so that on displacement of the field, and even sudden reversal of the same, under the urgency of the developed magnetic torque, its inertia will not oppose the magnetic torque to such an extent as to cause an appreciable reaction in the armature and commutator assembly in the nature of an excessive forward torque surge therein, wherefore the inertia of the field hardly affects the aforementioned control of the output torque by the spring and, hence, the accurate performance of a time mechanism, for instance, when may be driven by the motor.

It is another object of the present invention to provide a motor of this type which, by virtue of the aforementioned axial air gap between the field and armature poles, permits the use of a simple bar-type permanent magnet as the field, thereby obtaining adequate torque for many purposes from a motor of comparatively small size, or quite considerable torque from a motor of larger size.

Other objects and advantages will appear to those skilled in the art from the following, considered in conjunction with the accompanying drawings.

In the accompanying drawings, in which certain modes of carrying out the present invention are shown for illustrative purposes:

Figs. 1 and 2 are end and side views, respectively, of a motor embodying the present invention;

Fig. 3 is an enlarged longitudinal section through the motor as taken on the line 3—3 of Fig. 1;

Fig. 4 is a cross section through the motor as taken on the line 4—4 of Fig. 3;

Figs. 5 and 6 are cross sections through the motor similar to Fig. 4, but showing certain motor parts in different operating positions;

Fig. 7 is a further enlarged cross section through the motor as taken on the line 7—7 of Fig. 3; and Fig. 8 is a fragmentary section similar to Fig. 7, but showing certain motor parts in different operating positions.

Referring to the drawings, and more particularly to Figs. 1 to 4 thereof, the reference numeral 10 designates a motor having a housing 12, an armature unit or assembly 14 and a field unit 16. The housing 12 comprises, in the present instance, a simple cup section 18 and an end section 20 which is suitably secured to the open end of the cup section. Preferably, both the cup and end sections 18 and 20 are made of any suitable non-magnetic material.

The armature unit 14 comprises, in the present instance, a shaft 22 carrying a magnetic anchor plate or disc 24 to which are permanently attached, as by staking, for instance, the reduced shanks 26 of a plurality of magnetic cores 28, presently three, having enlarged ends 30 which constitute the armature poles. The cores 28 and their poles 30 are spaced equally from the axis of the shaft 22 and also equiangularly thereabout (Fig. 4). Surrounding the cores 28 are coils 32 which may be connected in any conventional manner. In the present instance, these coils may be considered to be connected in conventional Y fashion, their inner ends being to this end connected with each other (not shown). Also carried by the shaft 22 is a commutator 34 which, in accordance with the exemplary number of armature coils 32, comprises three segments 36. The commutator segments 36 are, in the present instance, conveniently formed by outwardly formed ends of conductive strips 38 which are received in equiangularly spaced, radial grooves 40 in an insulating disc 42 and secured to the latter by rivets 44 which presently serve also as terminals for the respective commutator segments 36. The insulating disc 42 and conductive strips 38 with their segmental ends 36 may aptly be termed the commutator assembly, and the latter is with its disc 42 firmly mounted on the armature shaft 22 in such manner that the commutator segments 36 are concentric with the latter (Fig. 4). Each of the commutator segments 36 extends over slightly less than 120°, there being narrow gaps between them to keep them out of contact with each other. The commutator segments 36 are connected with the proper coils 32 by soldering or otherwise connecting the outer ends 46 of the latter to the respective terminals 44 (Figs. 3 and 4).

Since the exemplary motor shown is of the type having an axial air gap $g$ between the armature and field poles (Fig. 3), the field unit 16 may conveniently and advantageously be in the form of a flat magnetic bar having opposite pole ends 48 and 50. If the required output torque is quite considerable for the size of the motor, or if an exceptionally small motor is required to put out substantial torque, the field unit 16 is preferably in the form of a simple bar-type permanent magnet.

In accordance with an important aspect of the present invention, the field unit 16 is rotatably mounted in the housing 12. To this end, the bar-type field unit 16 is mounted on a sleeve 52, preferably through intermediation of a non-magnetic bush 54 (Fig. 3). The sleeve 52 is, in the present instance, journalled with one end 56 in the bottomwall 58 of the housing section 18, presently through intermediation of the journalled hub 60 of a member 62 to be described hereinafter. The sleeve 52 further receives, and serves as a journal bearing for, a considerable length of the armature shaft 22 which is additionally journalled in a bearing 64 in the housing section 20 (Fig. 3). The armature and field units 14 and 16 are thus journalled in the housing 12 for independent rotation coaxially of each other. A plug 66 in the end 56 of the sleeve 52 serves as a thrust bearing to take up end shake of the armature shaft 22, as well as to maintain the air gap $g$ of substantially uniform width $w$ between the poles of the armature and field units 14 and 16.

The magnetic circuit is formed by the anchor plate 24, the cores 28 with their poles 30, the air gap $g$, and the bar-type field unit 16. In order to confine the major magnetic flux to this circuit, the armature shaft 22 and the sleeve 52 are preferably of non-magnetic material.

Cooperating with the commutator 34 are a pair of brushes 68 and 70 which presently are in the form of resilient conductor wires mounted by terminal screws 72 on the end section 20 of the housing 12. The brushes 68 and 70 may thus be connected with a suitable current source, in this instance direct current, by leads 74 which may releasably be attached to the terminal screws 72 (Fig. 1).

In accordance with another important aspect of the present invention, the field unit 16, while rotatably mounted in the housing 12 as explained, is normally urged into a predetermined angular position and resiliently opposes its backing therefrom under the urgency of the developed torque in the motor. In the present example, this is achieved by a spring 76 which is interposed between the field unit 16 and the housing 12. In the present instance, the spring 76 is subjected to bending, being of the spiral coiled type. The spring 76, being preloaded as will be described presently, normally urges the field unit 16 into the dot-and-dash-line "idle" position shown in Fig. 8 in which the endwall 78 of a concentric slot or groove 80 therein bears against a stop 82 in the form of a pin projecting from the bottomwall 58 of the housing section 18 (see also Fig. 3). To this end, the inner end 84 of the spring 76 is anchored in a slot 86 in a collar formation 88 on the sleeve 52 and, hence, to the field unit 16, while the outer end 90 of this spring is anchored in a slotted pin 92 on the earlier mentioned member 62 and, hence, to the housing 18 as will be explained presently. Thus, the member 62 is in this instance a disc, preferably of non-magnetic material, which is with its hub 60 journalled in the bottomwall 58 of the housing section 18 coaxially of the armature and field units 14 and 16. Accordingly, the spring 76 may readily be preloaded by simply turning the disc 62, clockwise as viewed in Fig. 8, until the field unit 16 engages the stop pin 82 with the required force, the hub 60 of the disc 62 extending to this end to the outside of the housing 12 and being there provided with suitable provisions (not shown) for turning the disc with an appropriate tool. In order to prevent unloading or unwinding of the preloaded spring 76, suitable provisions are made releasably to lock the disc 62 to the housing 12 after the former has been turned to preload the spring. In the present instance, this is achieved with a spring washer 94 (Fig. 3) which is seated, and preferably staked, in a peripheral groove 96 in the hub 60 of the disc 62, and is formed annularly throughout with a multitude of serrations 98 which are seated in similar adjacent serrations 100 in the bottomwall 58 of the housing section 18 (Fig. 3). Thus, on turning the disc 62 for the purpose of preloading the spring 76, the spring washer 94 will yield and with its serrations 98 ride over the serrations 100 in the housing 12, but will register with the latter serrations and interlock therewith with sufficient force to prevent backing of the disc 62 under the urgency of the preloaded spring after the disc has been turned to achieve the desired preloading of the spring. Moreover, the automatic lock of the disc 62 to the housing 12 in any of a multitude of angular positions, as afforded by the serrated spring washer 94, permits ready adjustment of the preload of the spring 76 on merely turning the disc 62 to the desired angular disposition. Further, the ready accessibility of the hub 60 of the disc 62 from the outside of the housing 12 facilitates even further the task of turning this disc for preloading the spring 76 or for varying its preload, or both, and also facilitates the assembly of the motor in that this may be undertaken without regard to the preloading of the spring which may advantageously be undertaken after the motor is assembled.

The instant motor may be used to good advantage for a variety of purposes. Thus, this motor may be the prime mover of an electric timepiece for use wherever A. C. current is unavailable and direct current is readily available from a storage battery, for instance, as in the case of automobile clocks, for example. In considering the following described performance of the instant motor, let it be assumed that it is for the purpose of running an automobile clock. To that end, the armature shaft 22, which is the torque output shaft of the motor, is coupled to the clock movement (not shown) which includes a conventional escapement to control its rate. For its use as a clock motor, it is, of course, of vital importance that the torque output of the motor is substantially uniform and of a magnitude sufficient to drive the movement, yet insufficient to interfere with the rate-controlling performance of the escapement. This is achieved in the present motor by deriving the output torque from the spring 76 and using the developed magnetic torque in the motor only for periodically reloading the spring so that its force is maintained within a range in which the ensuing output torque of the motor is within permissible limits. Specifically, the lower limit of this operating range is defined by a spring force, hereinafter referred to as "minimum" force, which is of somewhat greater magnitude than its preload magnitude, while the upper limit of this range is defined by the maximum spring force achieved at the end of each periodic reloading of the spring by the magnetic torque in the motor.

Let it now be assumed that the present motor is connected with an escapement-controlled automobile clock, and also that the field unit 16 is a bar-type permanent magnet having the permanent N and S poles indicated in Figs. 4 to 6, and assuming further that the brushes 68 and 70 are connected with the positive and negative terminals, respectively, of a storage battery and the armature unit 14 is presently in the position shown in Fig. 4 in which the brushes 68 and 70 contact the commutator segments 36b and 36a, respectively, it then appears that the coils 32 around the armature cores 28a and 28b are presently undergoing commutation, with the result that the corresponding armature poles 30a and 30b are of S and N polarities, respectively, and are thus attracted to the adjacent N and S poles of the permanent-magnet field 16 with sufficient force magnetically to couple the latter and the armature poles 30a and 30b to each other with the field maintaining the illustrated position of minimum reluctance relative to these armature poles. The spring 76 is so arranged that its force will urge the field unit 16 in a clockwise direction as viewed in Fig. 4, and the armature unit 14 will follow the field unit by virtue of its magnetic coupling therewith, so that the output torque of the armature shaft 22 is derived from and completely controlled by this spring. The escape rate of the armature shaft 22 is, of course, controlled by the escapement of the connected clock movement, wherefore the period between commutation changes is also under the control of the escapement of the connected clock movement. The magnetically coupled armature and field units will thus gradually be driven in unison, clockwise as viewed in Fig. 4, by the spring 76 until the armature unit 14 reaches the position shown in Fig. 5 in which the commutator segment 36b is still in contact with the brush 68, but the commutator segment 36a has just moved out of contact with the brush 70 and commutator segment 36c has just come into contact with the latter. As a result, the coil 32 around the core 28b continues to undergo commutation, while the coil 32 around the core 28c now undergoes commutation in lieu of the coil around the core 28a, thus producing a magnetic field across the corresponding armature poles 30b and 30c. Significantly, it is the field unit 16 which will swing into line with this magnetic field in its effort to seek a position of minimum reluctance (Fig. 5), this being due to the fact that the armature unit 14 is prevented by the connected escapement-controlled clock movement from suddenly turning clockwise into a position of minimum reluctance with respect to the field unit. Thus, it is the spring-loaded field unit 16, rather than the armature unit 14, which gives way under the developed magnetic torque, this by virtue of the fact that the spring-loaded field unit offers the lesser resistance to this magnetic torque. In thus giving way to the magnetic torque and, hence, backing counter to the operating direction of the armature unit 14 to the extent indicated in Figs. 5 and 7, and more particularly through 60 degrees in the present instance, the field unit 16 winds the spring 76 from its minimum force to its maximum force (Fig. 7), so that for the time period during which the brushes 68 and 70 remain in contact with the respective commutator segments 36b and 36c the armature unit is driven by the spring, at a rate determined by the connected escapement-controlled clock movement, with a force which gradually decrease from its maximum to its minimum. The armature unit 14, by virtue of its magnetic coupling with the field unit 16, is thus driven by the spring 76 until the commutator segment 36b moves out of contact with the brush 68, i. e., through 60 degrees (Fig. 6). Immediately thereafter, the commutator segment 36a moves into contact with the brush 68, while the commutator segment 36c remains in contact with the brush 70, thereby setting up a magnetic field across the corresponding armature poles 30a and 30c (Fig. 6) with which the field unit 16 will align in its effort to seek a position of minimum reluctance. In doing so, the field unit 16 will swing or back from the position shown in Fig. 6 into that shown in Fig. 5, i. e., through 60 degrees, thereby again rewinding the spring 76 to its maximum force for a renewed run-down of the same to its minimum force in driving the armature unit 14 at a rate determined by the connected escapement-controlled clock movement. The field unit 16 thus backs up through 60 degrees, from the position shown in Fig. 6 to that shown in Fig. 5, on each commutation change and ensuing angular shift, in a rotary fashion, of the magnetic field produced in the armature unit, and it is during each back-up of the field unit that the spring 76 is reloaded from its minimum force to its maximum force. Between back-ups, the field unit 16 will be magnetically coupled to the armature unit 14 to transmit the driving force of the spring to the latter and connected clock movement. Of course, the drive of the armature unit 14 and, hence, of the clock movement connected therewith is at all times under the control of the spring 76, even when the field unit 16 backs up and the armature units is then driven by the magnetic torque which, however, is never greater than the maximum spring torque in the field unit with which the latter resists its back-up.

When the motor is stopped, the armature unit 14 may come to rest in any angular position, but the field unit 16 will, under the urgency of the spring 76, be backed into its preload position against the stop pin 82 (Fig. 8), i. e., in any event clockwise beyond the position shown in Fig. 6 in which the spring has the aforementioned minimum operating force. The extent of the back-up of the field unit from the position in Fig. 6 to its idle or preload position is rather immaterial, depending on the initial coordination of the commutator 34 with the spring-loaded field unit and stop 82, which is in any event such as to retain the field unit in step with the commutation even when the field unit is in its stop or preload position. It is, of course, imperative that the field unit is, on a stop of the motor, spring-urged or backed beyond the operating position shown in Fig. 6, i. e., into a stop position other than of minimum reluctance at any instant in the rotating magnetic field when the motor runs, if the output torque of the motor is to remain under the exclusive control of the spring.

It is apparent from the foregoing that the spring 76 may readily be calibrated so that its maximum force and minimum force vary relatively little in magnitude despite the exemplary 60 degree displacement or back-up of the field unit 16 for each reloading of the spring, with the result that the output torque will be substantially uniform, and in any event sufficiently uniform to drive the clock movement without interfering with the rate-controlling function of the escapement thereof. Further, by arranging for an axial gap between the armature and field poles, as in the exemplary motor shown, the field unit may be designed to have a low moment of inertia, with the result that on each back-up of the same, and even sudden reversal into back-up direction, under the urgency of the developed magnetic torque, its inertia will not appreciably oppose the magnetic torque, and in any event insufficiently to cause any appreciable reaction in the armature unit which would upset its drive control by the escapement of the connected clock movement. Also, the design of the exemplary motor around an axial air gap between the armature and field poles readily permits the arrangement of the various motor parts so that the motor is well balanced, both statically and dynamically.

The rotary mounting of the field unit 14 in the motor and the interposition of the operating spring 76 between the field unit and motor housing are, of course, features of prime importance and advantage. Thus, this construction permits the advantageous use of an entirely conventional armature and commutator assembly with its usual shaft. Also, this construction permits the use of enduring non-flexible lead connections between the armature coils and commutator segments, regardless of whether these coils are connected in conventional Y or Δ fashion. The construction of a motor of this type is thus considerably simplified and its assembly facilitated. Also, while resilient opposition to each back-up of the field unit could be achieved by a permanent magnet (not shown) in the motor housing in suitable relationship with the field unit, the preferred provision of the spring between the field unit and motor housing is highly advantageous, in that its anchorage with one end of the motor housing permits not only ready preloading of the spring after the motor is fully assembled but also ready variation of the preload of the spring, even from the outside of the motor housing.

The instant motor is also readily adaptable as a dynamometer due to the easily perceptible yield or displacement of its field unit which may be calibrated to indicate the commensurate torque on an associated scale. Thus, any load, such as a gear drive, for instance, may be coupled to the armature shaft 22 of the instant motor, and the requisite torque for starting the load and driving the same at any speed may readily be determined from the displacement of the field unit 16. As another example, the instant motor may also be used as a dynamometer to determine the stalling torque of another motor from the displacement of the field unit 16. In either case, current is applied to the armature to obtain the desired result. Due to its regulated torque output, the instant motor may also serve as a prime mover and tension control for winding operations requiring fairly constant tension in the material being wound. Moreover, the ready adjustability of the preload of the spring, not only from the outside of the motor, but even while the latter is running, is of particular advantage when the motor is used as a dynamometer or as a prime mover and tension control for winding operations.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A motor, comprising a housing; armature and field units having cooperating sets of poles and being independently turnable in said housing so as to maintain an air gap of substantially uniform width between said pole sets; coils carried by one of said units in association with the poles thereof and adapted, on energization, to magnetize them; commutation means actuated by said armature unit for energizing said coils in a sequence to produce a rotating magnetic field in said one unit; and means normally urging said field unit with a predetermined force into a predetermined angular position other than of minimum reluctance in said magnetic field at any instant and resiliently opposing its backing from said position under the urgency of the developed magnetic torque in the motor.

2. A motor, comprising a housing; armature and field units having cooperating sets of poles and being independently turnable in said housing so as to maintain an air gap of substantially uniform width between said pole sets; coils carried by one of said units in association with the poles thereof and adapted, on energization, to magnetize them; commutation means actuated by said armature unit for energizing said coils in a sequence to produce a rotating magnetic field in said one unit; a stop in said housing for engagement by said field unit in an angular position other than of minimum reluctance in said magnetic field at any instant; and a preloaded spring interposed between said housing and field unit normally urging the latter against said stop and opposing its backing away therefrom under the urgency of the developed magnetic torque in the motor.

3. A motor as set forth in claim 2, further comprising means for varying the preload of said spring.

4. A D. C. motor, comprising a housing; armature and field units having cooperating sets of poles and being independently turnable in said housing so as to maintain an air gap of substantially uniform width between said pole sets; coils carried by said armature unit in association with the poles thereof and adapted, on energization, to magnetize them; means including a commutator and brushes carried by said armature unit and housing, respectively, for energizing said coils in a sequence to produce a rotating magnetic field in said armature unit; a stop in said housing for engagement by said field unit in an angular position other than of minimum reluctance in said magnetic field at any instant; and a preloaded spring interposed between said housing and field unit normally urging the latter against said stop and opposing its backing away therefrom under the urgency of the developed magnetic torque in the motor.

5. A D. C. motor as set forth in claim 4, in which said spring is subjected to bending and anchored with its ends to said housing and field unit, respectively.

6. A D. C. motor as set forth in claim 4, in which said spring has opposite end connections with said housing and field unit, respectively, of which one of said end connections is adjustable to vary the preload of said spring.

7. A D. C. motor as set forth in claim 4, in which said spring has opposite end connections with said housing and field unit, respectively, of which one of said connections is adjustable to preload said spring and also vary its preload.

8. A D. C. motor as set forth in claim 4, in which said spring has opposite first and second end connections with said housing and field unit, respectively, of which said first connection is adjustable from the outside of said housing to preload said spring and also vary its preload.

9. A D. C. motor, comprising a housing with a longitudinal axis; armature and field units independently turnable in said housing about said axis thereof and having cooperating sets of poles opposing each other axially of said housing with an air gap of substantially uniform width between them; coils carried by said armature unit in association with the poles thereof and adapted, on energization, to magnetize them; means including a commutator and brushes carried by said armature unit and housing, respectively, for energizing said coils to produce a rotating magnetic field in said armature unit; a stop in said housing for engagement by said field unit in an angular position other than of minimum reluctance in said magnetic field at any instant; and a preloaded spring interposed between said housing and field unit normally urging the latter against said stop and opposing its backing away therefrom under the urgency of the developed magnetic torque in the motor.

10. A D. C. motor as set forth in claim 9, in which said field unit is a flat magnetic bar.

11. A D. C. motor as set forth in claim 9, in which said field unit is a bar-type permanent magnet.

12. A D. C. motor as set forth in claim 9, in which said spring is of the spiral coiled type and anchored with its ends to said housing and field unit, respectively.

13. A D. C. motor as set forth in claim 9, in which said spring is of the spiral coiled type and has opposite end connections with said housing and field unit, respectively, of which one of said end connections is angularly adjustable about said axis to vary the preload of said spring.

14. A D. C. motor as set forth in claim 9, in which said spring is of the spiral coiled type and has opposite first and second end connections with said housing and field unit, respectively, of which said first connection is turnable and angularly adjustable about said axis from the outside of said housing to preload said spring and to vary its preload.

15. A D. C. motor as set forth in claim 9, in which a member is turnable in said housing about said axis and releasably lockable in different angular positions to said housing from the outside thereof, and said spring is of the spiral coiled type and anchored with its ends to said member and field unit, so that said spring is preloaded and its preload varied on turning said member and locking it to said housing in different angular positions, respectively.

No references cited.